No. 892,619. PATENTED JULY 7, 1908.
L. N. PORTER.
HEATER FOR INCUBATORS AND BROODERS.
APPLICATION FILED JULY 10, 1907.
2 SHEETS—SHEET 1.
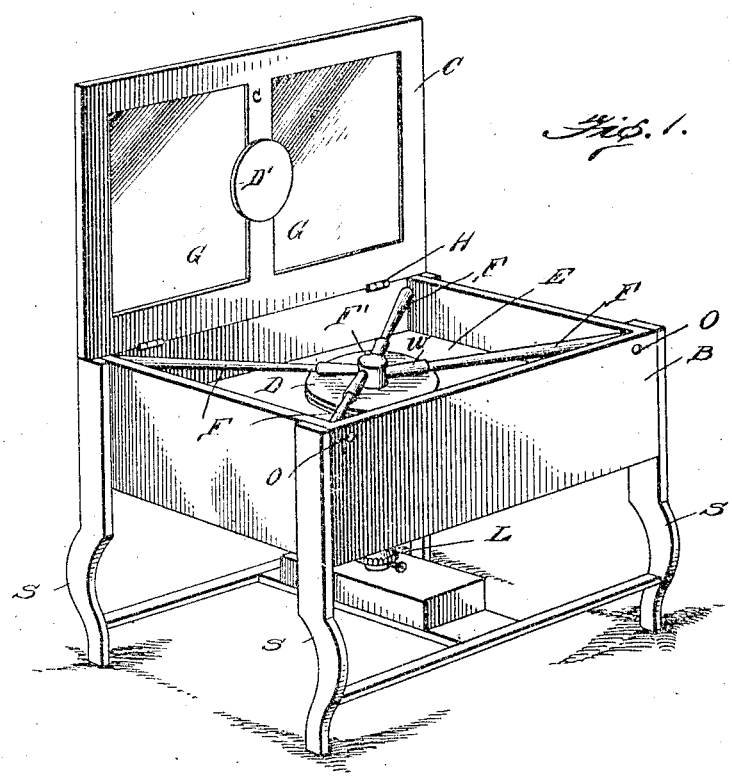
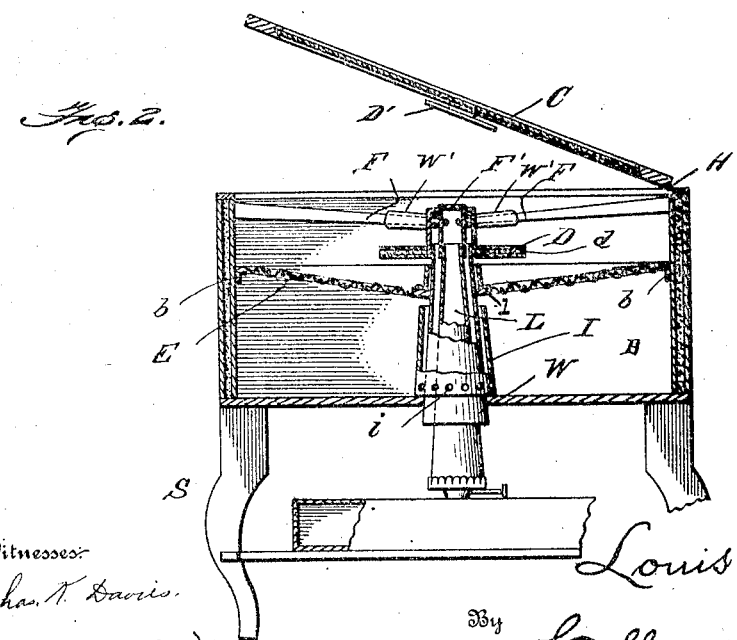

No. 892,619. PATENTED JULY 7, 1908.
L. N. PORTER.
HEATER FOR INCUBATORS AND BROODERS.
APPLICATION FILED JULY 10, 1907.
2 SHEETS—SHEET 2.
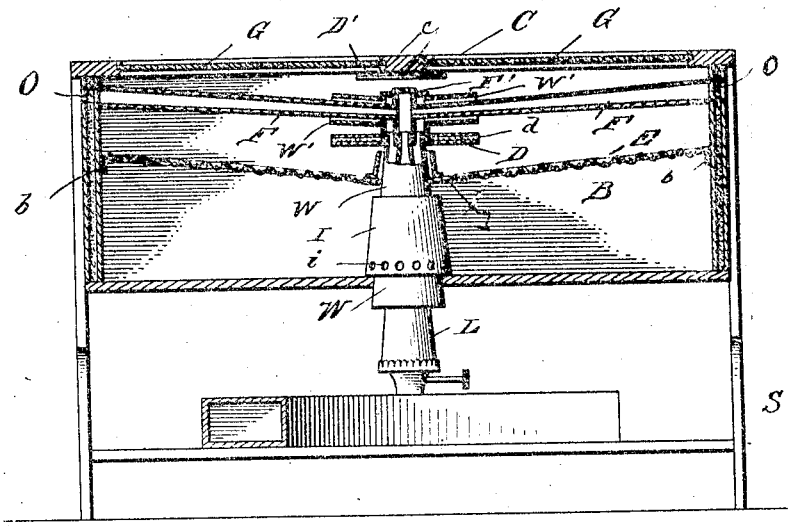
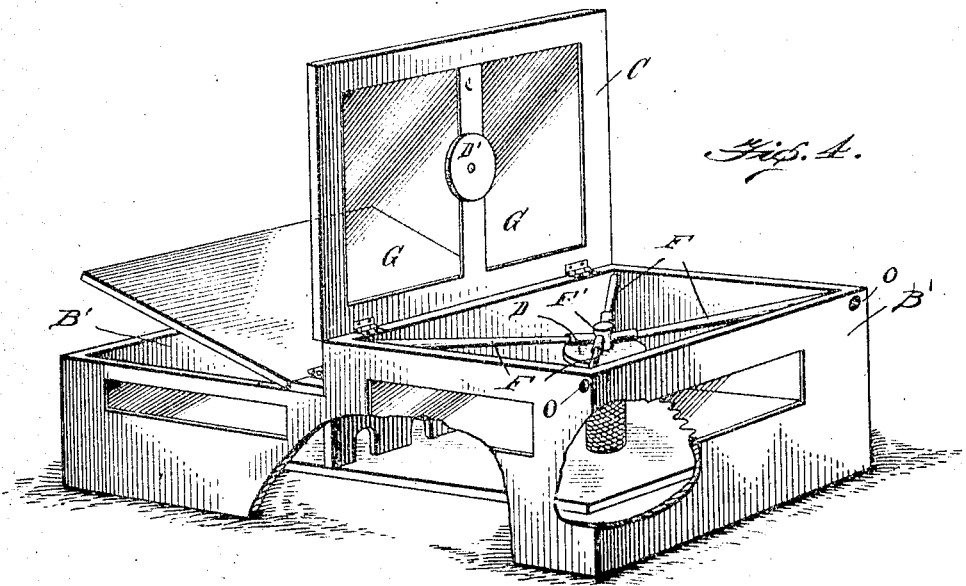

UNITED STATES PATENT OFFICE.

LOUIS N. PORTER, OF PONCA, NEBRASKA.

HEATER FOR INCUBATORS AND BROODERS.

No. 892,619.  Specification of Letters Patent.  Patented July 7, 1908.

Application filed July 10, 1907. Serial No. 383,082.

*To all whom it may concern:*

Be it known that I, LOUIS N. PORTER, a citizen of the United States, and resident of Ponca, Dixon county, State of Nebraska, have invented certain new and useful Improvements in Heaters for Incubators and Brooders; and my preferred manner of carrying out the invention is set forth in the following full, clear, and exact description, terminating with a claim particularly specifying the novelty.

This invention relates to the care of live stock, and more especially to that class of devices thereunder known as incubators; and the object of the same is to produce an improved heater for incubators or brooders having a hinged or removable cover, wherein the flues shall be so arranged as to radiate the heat from a common center above the heater to the corners of the body or casing, the better to serve the objects in view.

To this end the invention consists in a central location for the heater (herein shown as a lamp), and the employment of a cover (herein shown as hinged) beneath which the branch flues are arranged, with a hood for receiving the products of combustion from the lamp or the heat from the heater, directing it into said flues, causing it to flow radially outward to the corners of the casing, and permitting it to escape into the air at those points.

The invention also consists in details of construction providing an egg tray of improved shape, and improved means for equalizing the heat which is flashed down upon it and that which circulates through and around it.

The following specification describes the present embodiment of my invention, reference being had to the accompanying drawings, in which—

Figure 1 is a perspective view of an incubator with my improvements attached. Fig. 2 is a vertical sectional view of the same with the hinged cover raised. Fig. 3 is a section on a diagonal line through the casing as shown in Fig. 1. Fig. 4 is a perspective view of a brooder with my improvements attached, partly broken away.

Referring to the drawings the letter B designates the body of the incubator or brooder mounted on legs or supports S, and L is the heater here shown as a lamp supported by said supports beneath the body with its chimney extending upward into the latter as shown. The egg tray E is supported at its edges on cleats *b* within the body and is dished or inclined slightly toward its center where it surrounds the heater, and said center may be additionally supported by a ring *l* or other device which fits upon said heater. I find a slightly conical or slightly dished egg tray useful in an incubator of this type where the products of combustion pass upward through its center and are hottest beneath the center of the cover. By preference I also employ a diaphragm D surrounding said heater, slightly above the center of the egg tray and having perhaps a diameter of four or five inches relatively to an egg tray about two feet square. As shown this diaphragm is of double thickness with an air space *d* between its two layers which latter may be of suitable material such as asbestos stiffened with wire netting. C is the cover which in the present case is hinged as at H to one edge of the body, although it could be removable entire without departing from the idea in view. By preference this cover has glass panels G within a suitable framework, permitting inspection of the interior, and possibly it has a central transverse strip *c* as of wood or cross strips if the body be large. I might here add that practically the same construction thus far described is used for the brooder as shown in Fig. 4 (excepting the egg tray) and there may be a run-way or exercising chamber B' for the little chicks communicating with the body B as shown. Otherwise substantially the heating system described below could be employed in a brooder as well as in an incubator.

Coming now more particularly to the present invention, the lamp chimney L or an extension therefrom forming the main flue extends upward through the bottom of the body B and communicates with the interior of a double-walled hood F', from which branch flues F radiate outward and preferably slightly upward to the four corners of the body and communicate with the outside air through outlets O, these flues preferably growing larger toward their outer ends whereby the direct heat will pass outward through them above the eggs on the egg tray. Next outside the direct heating flue L is a tube W concentric with it and spaced from it, and extending through the bottom of the body so as to admit the air around the flue L, carry it upward around the same and warm it in its passage, and direct it between the two concentric walls of the hood F'; and from the latter radiate what I will call warm air branch flues W' which loosely surround the main branch flues F and extend outward for a short distance as shown. Next outside the warm air passage is another tube I surrounding that lettered W and spaced from it, and this tube rests upon the bottom of the body and extends upward to or nearly to the egg tray E. Near its lower end it is perforated as at $i$ so that it takes in the cooler air at the bottom of the incubating chamber, passes it up outside the warm air flue, and delivers it at a slightly higher temperature beneath the egg tray. This I called the interior passage of flue because it does not take its inlet from the exterior of the body nor deliver its outlet thereto.

The sizes and proportions of parts are immaterial excepting about as herein stated and about as shown in the drawings. It will be clear that direct heat will pass up the main flue L and out the main branches F; cool air will pass up through the flue W and be warmed, and pass out the warm air branches W' into the interior of the body; the atmosphere therein will be circulated by the interior passage I; these compound concentric flues around the main flue L will prevent excessive heating below the egg tray, and the diaphragm D will prevent the heat in the hood F' from unduly affecting the eggs near the center of the tray; and finally the dished shape of the latter will equalize the heat flashed down upon it from the upper portion of the interior.

I have illustrated and described no thermometer or thermostat, and no egg turner or moistener, because these details form no part of the present invention.

I have illustrated in Fig. 1 an additional diaphragm D' carried by the cover at a point immediately above the hood and surrounding flues and where there is the greatest heat, the purpose of this diaphragm being to prevent breaking the glass if employed in the cover.

What is claimed as new is:

1. In an incubator, the combination with the body having outlets at its corners, a main flue directed upward thereinto, a hood with which it communicates, and main branches radiating from the hood to said outlets; of an egg tray supported in the body and surrounding said flue, and a diaphragm surrounding the heater at a point between the branches and egg tray.

2. In an incubator, the combination with the body having outlets at its corners, a main flue directed upward thereinto, a hood with which it communicates, and main branches radiating from the hood to said outlets; of an egg tray supported in the body and surrounding said flue, and a diaphragm between the hood and egg tray said diaphragm being smaller than the interior of the body and composed of two non-conducting sheets with a narrow space between them.

3. In an incubator, the combination with the body having outlets at its corners, a main flue directed upward thereinto, a hood with which it communicates, and main branches radiating from the hood to said outlets; of an egg tray supported in the body and surrounding said flue, a tube surrounding said flue below the egg tray and producing an air passage, and a diaphragm surrounding the heater at a point between the branches and egg tray.

4. In an incubator, the combination with the body having outlets at its corners, a main flue directed upward thereinto, a hood with which it communicates, and main branches radiating from the hood to said outlets; of an egg tray supported in the body and surrounding said flue, said egg tray being dished or depressed at its center, and a diaphragm surrounding the heater at a point between the branches and egg tray.

5. In an incubator, the combination with the body having outlets at its corners, a main flue directed upward thereinto, a hood with which it communicates, and main branches radiating from the hood and rising slightly to said outlets; of an egg tray supported in the body and surrounding said flue, said egg tray being dished or depressed at its center.

6. In an incubator, the combination with the body having outlets at its corners, a main flue directed upward thereinto, a hood with which it communicates, and main branches radiating from the hood and rising slightly to said outlets; of an egg tray supported in the body and surrounding said flue, said egg tray being dished or depressed at its center, and a diaphragm surrounding the heater at a point between the branches and egg tray.

7. In an incubator or brooder, the combination with the body having outlets at its corners, and a hinged cover therefor containing glass panels; of a main flue directed upward into the body, a centrally disposed hood with which it communicates, main branches radiating from the hood to said outlets and standing near said cover, and a diaphragm supported by the latter between it and said branches.

In testimony whereof I have hereunto subscribed my signature this the 3rd day of July, A. D. 1907.

LOUIS N. PORTER.

Witnesses:
 WILL F. MIKESELL,
 C. HOEKSTED.